(12) United States Patent
Keeney et al.

(10) Patent No.: US 9,283,818 B2
(45) Date of Patent: Mar. 15, 2016

(54) TIRE INFLATION SYSTEM WITH EXTERNAL PRESSURIZED GAS ROUTING

(71) Applicant: ArvinMeritor Technology, LLC, Troy, MI (US)

(72) Inventors: Christopher Keeney, Troy, MI (US); Eric Lewandowski, Summerville, SC (US); John D. Morgan, Medina, OH (US); Michael Andrew Power, Troy, MI (US); James Keane, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 248 days.

(21) Appl. No.: 14/017,835

(22) Filed: Sep. 4, 2013

(65) Prior Publication Data

US 2015/0059946 A1 Mar. 5, 2015

(51) Int. Cl.
*B60C 23/00* (2006.01)
*B62D 35/00* (2006.01)

(52) U.S. Cl.
CPC .............. *B60C 23/003* (2013.01); *B62D 35/00* (2013.01)

(58) Field of Classification Search
CPC .... B60C 23/00; B60C 23/001; B60C 23/003; B60C 23/004; B60C 23/10; B60C 29/00; B60P 3/32; B60P 3/36
USPC ................... 141/38; 152/415–417; 280/768
See application file for complete search history.

(56) References Cited

U.S. PATENT DOCUMENTS

| | | | |
|---|---|---|---|
| 1,016,896 A | | 2/1912 | Rivers |
| 1,165,876 A | * | 12/1915 | Heberling ..................... 152/417 |
| 2,579,048 A | | 12/1951 | Paul |
| 6,095,562 A | * | 8/2000 | Busse ............................ 280/762 |
| 6,994,136 B2 | | 2/2006 | Stanczak |
| 7,931,061 B2 | | 4/2011 | Gonska et al. |
| 8,505,943 B2 | * | 8/2013 | Barron .......................... 280/160 |
| 2010/0264691 A1 | * | 10/2010 | Giromini et al. ........... 296/180.4 |
| 2012/0186714 A1 | | 7/2012 | Richardson |
| 2012/0234447 A1 | | 9/2012 | Narloch et al. |

FOREIGN PATENT DOCUMENTS

FR 716087 A 12/1931

OTHER PUBLICATIONS

European Patent Office, Extended Search Report for the corresponding European Patent Application No. 14177866.2 mailed Jan. 21, 2015.
MERITOR an ArvinMeritor brand, Meritor Tire Inflation System (MTIS) by PSI(TM), including Mentor ThermALERT (TM), PB-9999, Revised May 2007.

* cited by examiner

*Primary Examiner* — John Walters
*Assistant Examiner* — James Triggs
(74) *Attorney, Agent, or Firm* — Brooks Kushman P.C.

(57) ABSTRACT

A tire inflation system for a vehicle. The tire inflation system may include a gas supply subsystem that may supply pressurized gas to a tire via first conduit that may be connected to an axle shaft.

20 Claims, 3 Drawing Sheets

TIRE INFLATION SYSTEM WITH EXTERNAL PRESSURIZED GAS ROUTING

TECHNICAL FIELD

This patent application relates to a tire inflation system that may provide pressurized gas for inflating a tire external to a wheel end assembly.

BACKGROUND

A tire inflation system is disclosed in U.S. Pat. No. 7,931,061.

SUMMARY

In at least one embodiment, a tire inflation system for a vehicle is provided. The tire inflation system may include a wheel end assembly, an air skirt, and a gas supply subsystem. The wheel end assembly may have a tire that may be rotated about an axis by an axle shaft. The air skirt may be spaced apart from and may extend over the wheel end assembly to at least partially conceal the tire. The gas supply subsystem may supply pressurized gas to the tire. The gas supply subsystem may include a first conduit and a second conduit. The first conduit may extend from the air skirt to the axle shaft. The second conduit may supply pressurized gas to the tire.

In at least one embodiment, a tire inflation system for a vehicle is provided. The tire inflation system may include a wheel end assembly, a cross member, and a gas supply subsystem. The wheel end assembly may have a tire that may be rotated about an axis by an axle shaft. The cross member may be disposed on a body side panel of the vehicle and may extend across a wheel opening. The gas supply subsystem may supply pressurized gas to the tire. The gas supply subsystem may include a first conduit and a second conduit. The first conduit may be disposed proximate the cross member and may extend from the cross member to the axle shaft. The second conduit may supply pressurized gas to the tire.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
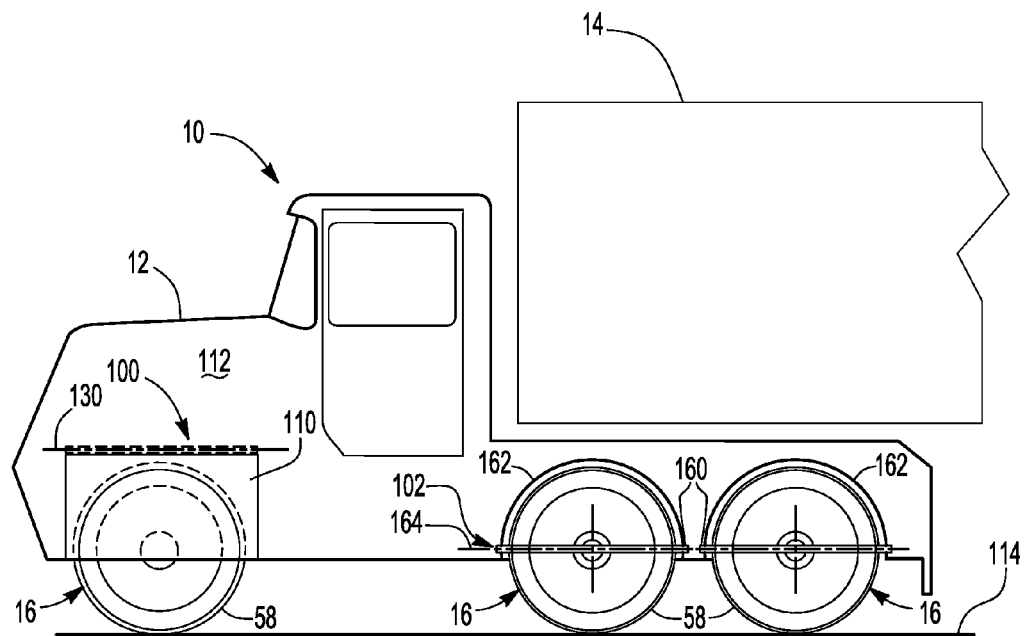
FIG. 1 is an illustration of an exemplary vehicle having a tire inflation system.

Referring to FIG. 1, an exemplary vehicle 10 is shown. The vehicle 10 may be a motor vehicle like a truck, bus, farm equipment, military transport or weaponry vehicle, or cargo loading equipment for land, air, or marine vessels. For example, the vehicle 10 may be configured as a truck and may include a tractor 12 and a trailer 14.

The tractor 12 may receive a driver and may propel and steer the vehicle 10. For example, the tractor 12 may have a plurality of axle assemblies 16. The front axle assembly 16 may be configured to steer the vehicle 10. In addition, the front axle assembly 16 may or may not be configured as a drive axle that provides torque to propel the vehicle 10. The rear axle assembly 16 may be disposed rearward of the front axle assembly 16 and may configured as a drive axle in one or more embodiments. In FIG. 1, a tandem rear axle configuration is shown, but a different number of rear axle assemblies may be provided in various embodiments.

The trailer 14 may be coupled to the tractor 12 and may be configured to receive cargo. A front portion of the trailer 14 may extend over a rear axle assembly 16 of the tractor 12.

Figure 2:
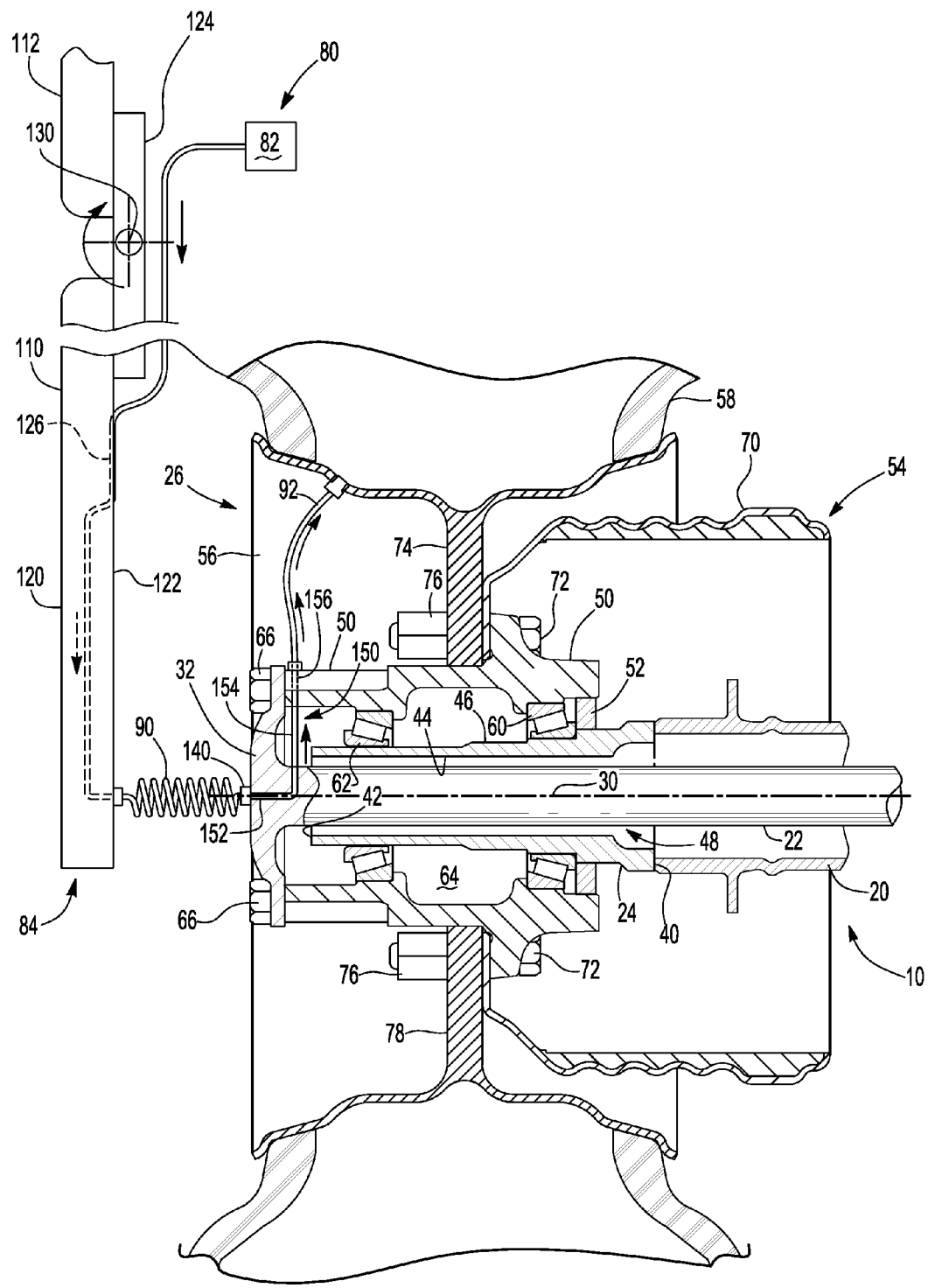
FIGS. 2 and 3 are section views of exemplary wheel end assemblies and an air skirt that may be provided with the vehicle.

Referring to FIG. 2, a portion of an axle assembly 16 is shown in more detail. The axle assembly 16 may be configured as a drive axle that may receive torque from a power source, such as an internal combustion engine or electric motor. Alternatively, the axle assembly 16 may be configured as a non-drive axle in one or more embodiments. The axle assembly 16 may or may not be steerable. In a drive axle configuration, the axle assembly 16 may include an axle housing 20, an axle shaft 22, a spindle 24, and a wheel end assembly 26.

The axle housing 20 may receive various components of the axle assembly 16. In addition, the axle housing 20 may facilitate mounting of the axle assembly 16 to the vehicle 10. The axle housing 20 may define a cavity that may receive at least a portion of the axle shaft 22.

The axle shaft 22 may provide torque to the wheel end assembly 26 to propel the vehicle 10. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 2, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 2, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle 10 and may be configured to provide a pressurized gas or pressurized gas mixture to one or more tires 58. For clarity, the term "pressurized gas" may refer to either a pressurized gas or a pressurized gas mixture. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle 10 and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits, such as a hose, tubing, pipe, or combinations thereof. In FIG. 2, a first conduit 90 and a second conduit 92 are shown. The first conduit 90 may be fluidly connected to or may receive pressurized gas from the pressurized gas source 82 and supply pressurized gas to the wheel end assembly 26. The second conduit 92 may supply pressurized gas to the tire 58. In addition, one or more valves may be associated with or provided with a conduit to enable or disable the flow of the pressurized gas from the pressurized gas source 82 to one or more tires 58. The flow of pressurized gas is represented by the small arrows in the conduits in the Figures.

Referring again to FIG. 1, two examples of gas supply subsystems 84 are shown. A first version 100 of a gas supply subsystem 84 is shown with the front axle assembly 16 and a second version 102 of a gas supply subsystem 84 is shown with the rear axle assemblies 16. The positioning of the first and second versions 100, 102 on the vehicle 10 is merely an example. For instance, the first version 100 of the gas supply subsystem 84 may be provided with one or more rear axle assembly 16 or the second version 102 of the gas supply subsystem 84 may be provided with a front axle assembly 16.

Referring to FIGS. 1 and 2, the first version 100 of the gas supply subsystem 84 may include an air skirt 110. The air skirt 110 may be mounted to a chassis and/or a body side panel 112 of the vehicle 10. The body side panel 112 may form an exterior surface of the vehicle 10 and may be provided with the tractor 12 and/or trailer 14 in one or more embodiments. The air skirt 110 may be spaced apart from the wheel end assembly 26 and may help improve vehicle aerodynamics to improve fuel economy. In addition, the air skirt 110 and may extend downward or toward a road or support surface 114 upon which the vehicle 10 may be disposed. The air skirt 110 may extend at least partially over the wheel end assembly 26 to at least partially conceal the tire 58. For example, the air skirt 110 may extend downward past the axis 30 and may conceal or cover more than half of the axle flange 32, the wheel 56, and the tire 58. In at least one embodiment, the air skirt 110 may include an exterior surface 120, an interior surface 122, and a hinge 124.

The exterior surface 120 may be an exterior surface of the vehicle 10. The exterior surface 120 may face away from the wheel 56 and tire 58.

The interior surface 122 may be disposed opposite the exterior surface 120. The interior surface 122 may face toward and may be spaced apart from the wheel 56 and the tire 58. In at least one embodiment, the first conduit 90 may be disposed proximate the interior surface 122. For example, the first conduit 90 may be entirely or partially configured as a tube, pipe, or the like that may be mounted to the air skirt 110 or may be partially configured as a through hole that may be at least partially defined in the air skirt 110. For example, the first conduit 90 may be disposed on or may engage the interior surface 122 as is best shown in the upper portion of the air skirt 110 shown in FIG. 2. In at least one embodiment, the first conduit 90 may be received in a groove 126 that may be configured as an indentation in the interior surface 122. The first conduit 90 may be snap fit or pressed into the groove 126 to mount the first conduit 90 to the air skirt 110. In addition or alternatively, the first conduit 90 may extend through or may be configured as a through hole that may extend through the air skirt 110 as is best shown in the lower portion of the air skirt 110 shown in FIG. 2.

The hinge 124 may be disposed proximate the air skirt 110. In FIG. 1, the hinge 124 is disposed on an interior surface of the body side panel 112 and the interior surface 122 of the air skirt 110. The hinge 124 may allow the air skirt 110 to pivot or move with respect to the body side panel 112. For example, the hinge 124 may allow the air skirt 110 to pivot about a hinge axis 130 and move away from the wheel end assembly 26 to provide access to the wheel end assembly 26 to facilitate servicing, such as removing the wheel 56 or changing a tire 58. In FIGS. 1 and 2, the air skirt 110 is shown in a nominal position in which the air skirt 110 is not pivoted about the hinge axis 130. The hinge 124 may be generally positioned near an edge of a wheel opening and above the outside circumference of the tire 58 in one or more embodiments.

Referring to FIG. 2, the routing of pressurized gas from the air skirt 110 to the tire 58 will now be discussed in more detail. At least a portion of the first conduit 90 may extend from the air skirt 110 to the axle shaft 22 or the axle flange 32. The first conduit 90 may be configured to flex or extend to facilitate pivoting of the air skirt 110 about the hinge axis 130 and/or to facilitate movement of the axle assembly 16 with respect to the air skirt 110. For example, the first conduit 90 may be disposed in a coil or may have a serpentine configuration between the air skirt 110 and the axle shaft 22 when the air skirt 110 is in the nominal position and may uncoil or extend when the air skirt 110 is pivoted away from the wheel end assembly 26. Movement of the axle assembly 16 may occur due to operation of a vehicle suspension system. More specifically, the axle assembly 16 may be mounted to a vehicle suspension system and may move to compensate for road surface variations and improve ride comfort and performance.

A rotary coupling 140 may be provided to permit the axle shaft 22 to rotate with respect to the first conduit 90. The rotary coupling 140 may be disposed between the air skirt 110 and the axle shaft 22. For example, the rotary coupling 140 may be disposed between the air skirt 110 and a first end or portion of the first conduit 90 that is disposed proximate the air skirt 110 and/or at a second end of the first conduit 90 that is disposed proximate the axle flange 32. In FIG. 2, the rotary coupling 140 is disposed between the first conduit 90 and the axle flange 32 and may be located near the axis 30 or may be coaxially disposed with the axis 30.

An intermediate passage 150 may fluidly connect the first conduit 90 to the second conduit 92. The intermediate passage 150 may be disposed in the wheel end assembly 26. The intermediate passage 150 may include an axle flange port 152, a third conduit 154, and a hub passage 156.

The axle flange port 152 may be provided in the axle flange 32. The axle flange port 152 may be configured as a through hole that may extend through the axle shaft 22 and/or axle flange 32. In at least one embodiment, the axle flange port 152 or a portion thereof may be coaxially disposed with the axis 30. The axle flange port 152 may be disposed proximate or may receive the rotary coupling 140 in one or more embodiments. As such, the first conduit 90 may supply pressurized gas to the axle flange port 152.

The third conduit 154 may extend between and may fluidly connect the axle flange port 152 to the hub passage 156. The third conduit 154 may be disposed in the cavity 64 in the wheel end assembly 26 and may be spaced apart from the spindle 24. The third conduit 154 may have any suitable configuration. For example, the third conduit 154 may be configured as a tube, pipe, or the like.

The hub passage 156 may be provided in the hub 50. The hub passage 156 may be configured as a through hole that may extend through the hub 50. The hub passage 156 may extend radially with respect to the axis 30 in one or more embodiments. The hub passage 156 may provide pressurized gas to the second conduit 92.

Figure 3:
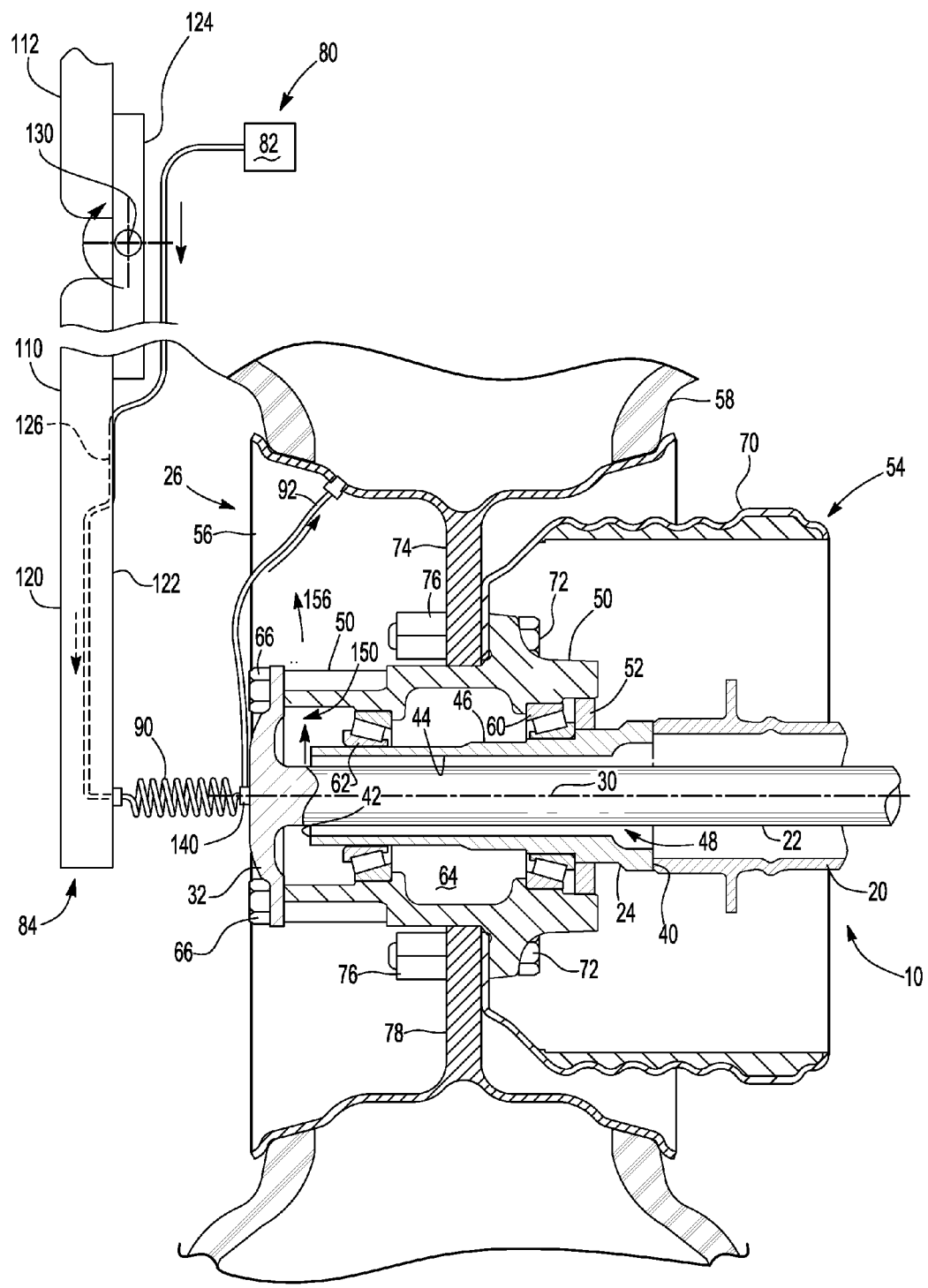

Referring to FIG. 3, another version of an axle assembly 16 and gas supply subsystem 84 is shown. FIG. 3 is similar to FIG. 2, but is configured such that pressurized gas is not routed through the interior of the wheel end assembly 26. Instead, the second conduit 92 may be routed external to the wheel end assembly 26, such as from the rotary coupling 140 to the tire valve. As such, the axle flange port 152, third conduit 154, and hub passage 156 may be omitted.

Figure 4:
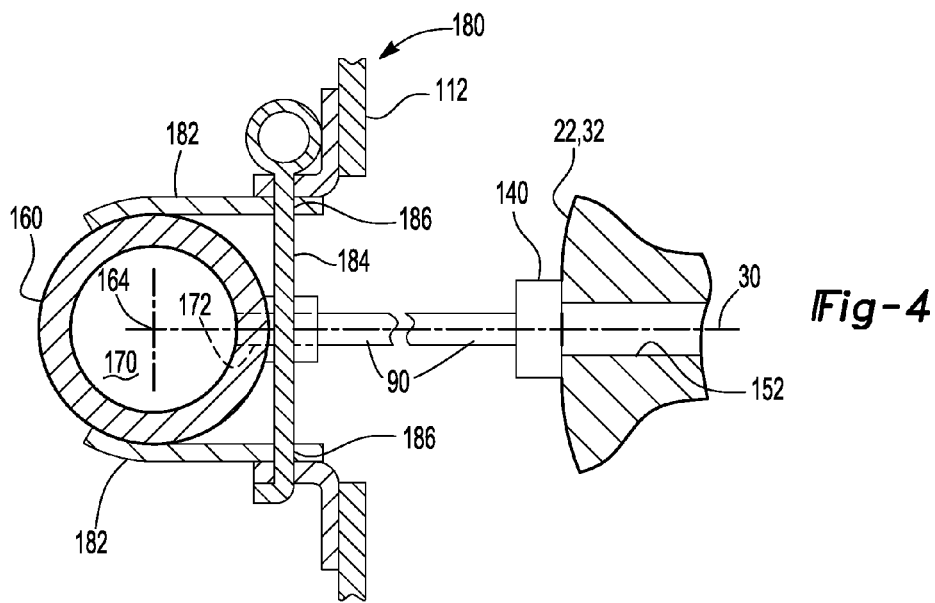
FIGS. 4 and 5 are section views of cross members that may be provided with the tire inflation system.
Figure 5:
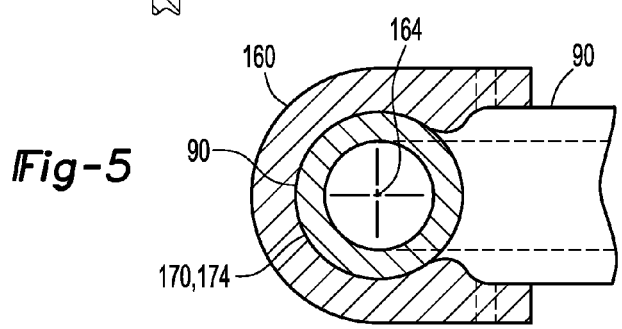

Referring to FIGS. 1, 4 and 5, a second version 102 of the gas supply subsystem 84 is shown. The second version 102 of the gas supply subsystem 84 may include a cross member 160. The cross member 160 may be disposed on the body side panel 112 and may extend across a wheel opening 162 that may receive the wheel end assembly 26. In at least one embodiment, the cross member 160 may extend along a cross member axis 164. The cross member axis 164 may extend in a substantially horizontal manner across the wheel opening 162.

The cross member 160 may be provided in various configurations. For example, the cross member 160 may be configured as a tube that may define an internal passage 170 that may provide pressurized gas to the first conduit 90 as is best shown in FIG. 4. The internal passage 170 may have an inlet and an outlet 172. The inlet may receive pressurized gas from the pressurized gas source 82. The outlet 172 may supply pressurized gas to the first conduit 90 or a portion of the first conduit 90 that may fluidly connect the cross member 160 to the axle flange port 152. The outlet 172 may be disposed proximate or may be coaxially disposed with the axis 30. A rotary coupling 140 may be disposed between the outlet 172 and the axle flange port 152. In FIG. 4, the rotary coupling 140 is disposed between the first conduit 90 and the axle flange port 152 of the axle shaft 22.

Referring to FIG. 5, the cross member 160 may be configured such that it does not provide pressurized gas to the first conduit 90. Instead, the first conduit 90 may be configured as a separate component from the cross member 160. In such an embodiment, the first conduit 90 may extend through the internal passage 170 may be received in a groove 174 in the cross member 160. The first conduit 90 may be received in the groove 174 such that the first conduit 90 may be snap fit or pressed into the groove 174 to mount the first conduit 90 to the cross member 160. Alternatively, the first conduit 90 may be fastened to the cross member 160 with a separate component that may have any suitable configuration. For instance, a fastener like a clip or clamp may be employed to secure the first conduit 90. The first conduit 90 may be disposed in a coil or may have a serpentine configuration between the cross member 160 and the axle shaft 22 and may be configured to flex or extend to facilitate pivoting of the air skirt 110 about the hinge axis 130 and/or to facilitate movement of the axle assembly 16 with respect to the cross member 160 as previously discussed.

Referring again to FIG. 4, the cross member 160 may be removable from the vehicle 10 to facilitate maintenance or repair actions, such as removal of the wheel 56 or changing a tire 58. For example, the cross member 160 may be disengaged from the body side panel 112 at one or both ends to facilitate access to the wheel end assembly 26. The cross member 160 may be selectively secured to the vehicle 10 with a mounting assembly 180. The mounting assembly 180 may include one or more mounting brackets 182 and a retaining member 184. One or more mounting brackets 182 may be fixedly disposed on the cross member 160 and/or the body side panel 112. The mounting brackets 182 may include an aperture 186 that may be configured to receive the retaining member 184. The retaining member 184 may have any suitable configuration. For example, the retaining member 184 may be configured as a pin or a key that may be disposed between the cross member 160 and the body side panel 112. The retaining member 184 may extend through one or more apertures 186 in the mounting brackets 182 to secure the cross member 160 to the body side panel 112. The retaining member 184 may be removed from the one or more apertures 186 to release the cross member 160 from the body side panel 112. Alternatively, the mounting assembly 180 may include clamps and fasteners that may secure the cross member 160 to the vehicle 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system for a vehicle comprising:
    a wheel end assembly having a tire that is configured to be rotated about an axis by an axle shaft;
    an air skirt that is spaced apart from the wheel end assembly and that extends over the wheel end assembly to at least partially conceal the tire, wherein the air skirt has a groove that faces toward the tire such that the groove is open in a direction that faces toward the tire; and
    a gas supply subsystem that supplies pressurized gas to the tire, wherein the gas supply subsystem includes a first conduit that extends from the air skirt to the axle shaft and a second conduit that supplies pressurized gas to the tire, wherein the first conduit is snap fit into the groove to mount the first conduit to the air skirt.

2. The tire inflation system of claim 1 wherein the first conduit extends through the air skirt.

3. The tire inflation system of claim 1 wherein the air skirt includes an exterior surface that faces away from the tire and an interior surface that faces toward the tire, wherein the first conduit is disposed on the interior surface.

4. The tire inflation system of claim 3 wherein the groove extends from the interior surface.

5. The tire inflation system of claim 1 further comprising a rotary coupling that is disposed proximate an axle flange that is disposed at a distal end of the axle shaft, wherein the rotary coupling permits the axle shaft to rotate with respect to the first conduit.

6. The tire inflation system of claim 5 wherein the second conduit extends from the rotary coupling to a wheel.

7. The tire inflation system of claim 5 wherein the rotary coupling is coaxially disposed with the axis.

8. The tire inflation system of claim 5 wherein the second conduit is entirely disposed outside the wheel end assembly.

9. The tire inflation system of claim 5 wherein the axle flange that has an axle flange port and the wheel end assembly has an intermediate passage, wherein the first conduit supplies pressurized gas to the axle flange port and the intermediate passage fluidly connects the first conduit to the second conduit.

10. The tire inflation system of claim 1 wherein the air skirt further comprises a hinge that permits the air skirt to pivot away from the wheel end assembly.

11. The tire inflation system of claim 10 wherein the first conduit is disposed in a coil between the air skirt and the axle shaft when the air skirt is in a nominal position.

12. A tire inflation system for a vehicle comprising:
    a wheel end assembly having a tire that is configured to be rotated about an axis by an axle shaft;
    a cross member that is disposed on a body side panel of the vehicle and that extends across a wheel opening, wherein the cross member has a groove that faces toward the tire such that the groove is open in a direction that faces toward the tire; and
    a gas supply subsystem that supplies pressurized gas to the tire, wherein the gas supply subsystem includes a first conduit that is disposed proximate the cross member and that extends from the cross member to the axle shaft and a second conduit that supplies pressurized gas to the tire, wherein the first conduit is snap fit into the groove to mount the first conduit to the cross member.

13. The tire inflation system of claim 12 wherein the cross member includes an outlet that is disposed proximate the axis.

14. The tire inflation system of claim 12 wherein the cross member extends along a cross member axis that extends substantially horizontal across the wheel opening.

15. The tire inflation system of claim 12 wherein the first conduit extends from the cross member to an axle flange port that is provided with the axle shaft.

16. The tire inflation system of claim 15 wherein the first conduit extends through the cross member.

17. The tire inflation system of claim 15 wherein the cross member supplies pressurized gas to the first conduit.

18. The tire inflation system of claim 15 further comprising a rotary coupling that is disposed proximate the first conduit and that permits the axle shaft to rotate with respect to the first conduit.

19. The tire inflation system of claim 18 wherein the rotary coupling is disposed between the first conduit and the axle shaft.

20. The tire inflation system of claim 12 further comprising a mounting assembly for removably securing the cross member to the body side panel, wherein the mounting assembly includes a retaining member that extends through an aperture in a mounting bracket that extends from the cross member.

* * * * *